(12) United States Patent
Bouhelal

(10) Patent No.: US 7,550,526 B1
(45) Date of Patent: Jun. 23, 2009

(54) HIGH IMPACT CLAY-POLYMER BLEND FORMED BY REVERSIBLE CROSS-LINKING IN THE PRESENCE OF PEROXIDE

(75) Inventor: Said Bouhelal, 1240 Orleans St., Beaumont, TX (US) 77701

(73) Assignees: Kenneth W. Lewis, Beaumont, TX (US); Mahrez Rezgui, Beaumont, TX (US); Said Bouhelal, Beaumont, TX (US)

( * ) Notice: Subject to any disclaimer, the term of this patent is extended or adjusted under 35 U.S.C. 154(b) by 0 days.

(21) Appl. No.: 11/838,778

(22) Filed: Aug. 14, 2007

Related U.S. Application Data

(63) Continuation-in-part of application No. 11/192,889, filed on Jul. 29, 2005, now abandoned.

(51) Int. Cl.
*C08K 9/06* (2006.01)

(52) U.S. Cl. .................. 524/445; 524/578; 524/493; 524/451

(58) Field of Classification Search .............. 524/578, 524/445, 493, 451
See application file for complete search history.

(56) References Cited

U.S. PATENT DOCUMENTS

| | | | | |
|---|---|---|---|---|
| 6,060,549 A | * | 5/2000 | Li et al. ................. | 524/445 |
| 2007/0015853 A1 | * | 1/2007 | Weng et al. ............. | 523/333 |

* cited by examiner

*Primary Examiner*—Ling-Siu Choi
(74) *Attorney, Agent, or Firm*—Buskop Law Group, PC; Wendy Buskop

(57) ABSTRACT

A high impact polymer adapted to be recyclable comprising a polymer, a cross-linking agent, an accelerator, and a nano-clay. The cross-linking agent comprises a sulfur and a peroxide with an activity ranging from 40% to 99%. The accelerator is present in ratios ranging from 1:2 to 1:10 in relation to the sulfur and the peroxide. The nano-clay comprises a weight percent ranging from 1% to 40%. The high impact polymer is formed by preparing the nano-clay with the cross-linking agent and accelerator. Next, the polymer and the nano-clay are mixed, initiating cross-linking. The high impact polymer is formed through creation of macro radicals which create macromolecular polymer chains with sulfur bridges without requiring high torque. The accelerator ensures that the cross-linking and the formation of sulfur bridges occur simultaneously, and partially inhibits the cross-linking. The nano-clay enhances the reversibility of the cross-linking and provides enhanced strength.

5 Claims, No Drawings

HIGH IMPACT CLAY-POLYMER BLEND FORMED BY REVERSIBLE CROSS-LINKING IN THE PRESENCE OF PEROXIDE

CROSS REFERENCE TO RELATED APPLICATIONS

The present application is a Continuation-in-Part to co-pending U.S. patent application Ser. No. 11/192,889, filed Jul. 29, 2005, which claims priority to U.S. patent application Ser. No. 10/473,351, filed Sep. 30, 2003, now U.S. Pat. No. 6,987,149, which is the national phase application claiming priority to PCT/DZ02/00001 filed Apr. 22, 2002, each of which are herein incorporated by reference in their entirety.

FIELD

The present embodiments relate generally to high impact polymers adapted to be recyclable. The high impact polymers are formed from cross-linking one or more polymers blended with a nano-clay in the presence of peroxide.

BACKGROUND

Recent developments in the art of polymerization have enabled the production of solid, amorphous polypropylene and co-polymers of ethylene and propylene that have many of the physical characteristics of rubber and, in fact, can be used as an improved replacement for rubber in many applications. These amorphous polymers and co-polymers are thermoplastic and soluble in many organic solvents. Like rubber, these polymers and co-polymers must be cross-linked, i.e. vulcanized, in order to render the polymers and co-polymers useful for many of the intended uses.

Almost all of the plastic resin sold in the market today is in the form of pellets. Plastic resins are sold in the form of pellets to improve transportation, handling, safety and end-user material processability characteristics. Reactor granular resin is thus melted and extruded and made to flow through dies before being cut into pellets. The extrusion process serves as a step for the addition of performance additives for the required stability and material properties. The size, shape, and uniformity of the pellets are important and measures of these pellet characteristics are standard quality assurance/ quality control (QA/QC) tests to be met during production. The pelletizing step is important from an operational standpoint. Any upset or malfunction of the pelletizer can result in process shutdown and halt manufacturing with serious financial consequences, especially for large extrusion lines. The pelletizing step becomes an important component of the production line of any polyolefin production facility. The pelletizing step is not to be taken lightly in cases where the polymer renders difficult cut.

A need exists for a polymer that possesses many of the characteristics of rubber, but is reversibly cross-linked, and therefore recyclable.

A need exists for a polymer capable of providing improved strength, comparable to that of conventional elastomers, while having high ductility and large insulating R-values.

A need exists for a reversibly cross-linked polymer possessing enhanced reversibility through blending with a nano-clay.

The present embodiments meet these needs.

DETAILED DESCRIPTION OF THE EMBODIMENTS

Before explaining the present embodiments in detail, it is to be understood that the embodiments are not limited to the particular embodiments and that it can be practiced or carried out in various ways.

The present embodiments relate to a high impact polymer that is advantageously adapted to be recyclable through use of reversible cross-linking. Cross-linked plastics, rubbers, and polymers usually cannot melt and, therefore, cannot be reprocessed or mixed with other polymers and reprocessed. Cross-linked plastics and rubber, therefore, cannot be recycled. Only polymers formed from reversible cross-linking can be reprocessed or recycled. These types of polymers are known as thermoplastic elastomers.

Use of the present recyclable high impact polymer conserves resources and reduces waste, such as non-biodegradable plastics and other polymers or chemical waste and pollutants from materials used to produce new polymers. Producing new polymers from recycled polymers also uses less energy than the production of new polymers from raw materials.

Additionally, the present recyclable high impact polymer can be produced from any polymer or thermoplastic material, which negates the need for any type of separation process during recovery or recycling of polymers or thermoplastic materials. Under the present embodiments, bulk thermoplastic materials can be used to produce a recyclable high impact polymer blend, thereby saving the time and costs associated with separate separation and recycling processes.

The high impact polymer can be advantageously formed by reversibly cross-linking any thermoplastic material. Conventional cross-linking methods are typically limited to specific materials, such as some isotactic polymers. The present high impact polymer can be formed by blending a nano-clay and a cross-linking agent with any polymer or thermoplastic material, including isotactic, crystalline, polar, non-polar, and amorphous polymers, miscible with other polymers using readily available chemicals.

The embodied high impact polymers are formed using less energy than conventional methods. The present high impact polymer can be created using any kind of mixer, such as a high shear rate mixer, however a very low torque at a low pressure is required, which conserves energy and related costs.

The present embodiments can also be advantageously created through a continuous feed process, in addition to batch processes. Production of reversibly cross-linked polymers, such as recyclable miscible polypropylene, can be immediately implemented for mass production. Use of a continuous feed process can conserve time and costs.

The present embodiments further advantageously use readily available chemicals and materials, further reducing expense and time associated with shipping of less readily available materials. For example, reversibly cross-linked polypropylene can be produced at only a nominal cost above the present cost of isotactic polypropylene. The cross-linking technique uses readily available chemical complexes, such as peroxide, sulfur, and catalysts, such as TMTM, TMTD and MBTS. The technique used to accomplish the cross-linking entails mixing the catalysts together and introducing the mixture into an extruder or mixer to mix at molten state with the desired combinations. For example, a cross-linked polypropylene can be recycled many times with the same extruder operating conditions. Any peroxide with a decomposition temperature greater that 140 degrees Celsius can be used in cross-linking.

The present embodiments can advantageously be produced in a single step, allowing high impact polymers to be produced efficiently, simply, and cost-effectively, without requiring highly specialized equipment, materials, or personnel. Use of a single step process conserves costs, time, and allows high impact, recyclable polymers to be produced without requiring specialized training or large quantities of equipment.

The present embodiments further combine one or more polymers with a nano-clay, which enhances the reversibility of the cross-linkage, provides greater durability and insulating properties, and allows any kind of polymer or thermoplastic material to be reversibly cross-linked. Nano-clay can be readily blended with any number of polymers or thermoplastic materials during the shearing process, distributing nano-clay layers throughout the high impact polymer.

When polymer clay nanocomposites are created, very thin silicate layers of clay are mixed on a molecular level in a polymer matrix. The nano-clay layers can be approximately one nanometer in thickness. The mechanical, thermal, and barrier properties of polymer clay nanocomposites are superior to both pristine polymers and conventional composites. When the nano-clay content is relatively small, such as less than 5% by weight, a superior nanocomposite is obtained. The nano-clay silicate layers are randomly and homogenously dispersed when exfoliated, which creates a superior nanocomposite because the structure of the nano-clay is not maintained in the new product.

The present high impact polymer can also be blended with a raw nano-clay, the nano-clay requiring only minimal purification to remove mineral impurities, such as such as by washing the nano-clay in distilled water then using centrifugation to remove the mineral impurities. Naturally-occurring metals can be retained while still effectively producing reversible cross-linkage of the polymer. The elimination of the need to remove metals from the nano-clay saves time that would be consumed by conventional purification and chemical treatment processes to obtain montmorillonites, and saves costs associated with chemical treatment materials and processes.

The present high impact polymer includes at least one polymer or other thermoplastic material, which can include isotactic polymers, polar polymers, non-polar polymers, crystalline polymers, amorphous polymers, syndiotactic polymers, atactic polymers, and combinations thereof. Both homopolymers and copolymers can be used. The homopolymer and copolymers can be granular, recycled, restored, or combinations thereof.

Use of recyclable isotactic polymers and other recyclable polymers is also contemplated. Possible isotactic polymers include isotactic polypropylene homopolymer, isotactic polypropylene copolymer, mixtures of isotactic polypropylene homopolymer with an elastomer, mixtures of isotactic polypropylene homopolymer with thermoplastic-based mixes, mixtures of isotactic polypropylene copolymer with an elastomer, mixtures of isotactic polypropylene copolymer with thermoplastic-based mixes, and combinations thereof.

One or more functionalized nano-clays can be mixed with the polymer or combination of polymers. The nano-clay can be any type of nano-clay, including layered silicate material, such as a silicate containing smectite or bentonite minerals, such as montmorillonite, a phyllosilicate, and other similar nano-clays or combinations of nano-clays. In an embodiment the nano-clay can include tetrahedral shaped layers, octahedral shaped layers, or combinations thereof.

The nano-clay can be functionalized using a peroxide, such as hydrogen peroxide, which can provide the nano-clay with an ionic charge, and can also swell the nano-clay, creating spaces between the layers of the nano-clay for allowing the one or more polymers to enter and adhere to the nano-clay layers via ionic attraction. The nano-clay is then dried. The drying can be performed by any means, such as placing the nano-clay in an oven for up to twenty four hours. It is contemplated that the dried nano-clay can have a particulate size of 63 micrometers or less, which permits fast miscibility, diffusion, and good dispersion of any undiluted material.

It is contemplated that the nano-clay can comprise from about 1% to 40% of the high impact polymer by weight. In an embodiment, the nano-clay can comprise from 4% to 5% by weight of the high impact polymer. It is further contemplated that an acetone can be added to the nano-clay after drying. The acetone, the cross-linking agent, and one or more accelerators can be simultaneously mixed with the nano-clay, using a mixer to ensure good diffusion. The acetone enhances the diffusion due to the fact that the peroxides are miscible with the acetone. The acetone further prevents water absorption by the functionalized nano-clay after preparation and removes any remaining free water in the nano-clay, while simultaneously improving the diffusion of the cross-linking agent and accelerators between interlayer spaces in the nano-clay.

The embodied cross-linking agent can include a peroxide and a sulfur. The peroxide of the cross-linking agent can be the same peroxide used to purify the nano-clay, or the peroxide can be a different peroxide.

The cross-linking reaction provides the high impact polymer with new morphological structures, while the crystalline portion of the polymer remains relatively stable. The cross-linking agent creates macro radicals at temperatures ranging from about 65 degrees Celsius to about 300 degrees Celsius. Conventional solvents, such as xylene, used to fix the agents without affecting color, are advantageously not required to produce the present recyclable high impact polymer. The use of acetone fixes the agents during the mixing process, and acetone possesses the additional advantage of having a low boiling point of approximately −40 degrees Centigrade, allowing the acetone to be easily removed from the nano-clay. The cross-linking agent can include from about 0.001% to about 10% by weight of peroxide and from about 0.01% to about 10% by weight of sulfur.

The peroxide can have an activity ranging from about 40% to about 99%. The percentage of activity of peroxide is related to the amount of peroxide active within the mixture. The peroxide can have a decomposition temperature greater than 100 degrees Celsius. The decomposition time is dependent on the activity of the peroxide and the temperature of decomposition. The activity influences the efficiency of the peroxide. Using different mixtures of peroxides can increase the decomposition time, and a paste can be used to delay the decomposition temperature.

The peroxide can be a powder or a granulate. Use of a powder can provide superior dispersion, especially if the powder is composed of granulars with similar granulometry. As the temperature rises, the powdered or granular peroxide becomes a liquid.

One example of an useable peroxide is a mixture of phthalate plasticizer and silicone oil. Other examples of peroxide can include dicymyl peroxide (DCP) (activities of 40%, 50%, 95%, and 96%), DI (2-terl-butylperoxydopropyl) benzene (activity of 85%), benzyl peroxide (activities of 50%, 70%, and 80%), 2,4-Dichlorobenzoyl-peroxide (activity of 50%), and 2,5-D-(t-butyl peroxy)-2,5-dimethylhexane (activities of 45% and 50%). The peroxide exhibits an exothermic reaction and can be explosive, so caution needs to be used for peroxides with a high activity.

Useable sulfur compounds include compounds having a sulfur atom $S_1$, a polysulfide $S_x$, a sulfur cyclic compound, and combinations thereof.

One or more accelerators can also be added to the cross-linking agent and the nano-clay. The accelerators can be present in ranges from about 0.0025% to about 2.5% by weight of the high impact polymer.

The accelerators can act as inhibitor agents for the peroxides. If an accelerator having potassium anions is used, the potassium anions can combine with the alkoide of peroxide after decomposition to form a salt. The formed salt acts on olefin chains to form double bonds and provide regeneration of the intermediate catalyst agent. The double bonds are useful to form bridges of polymer chains. The accelerator can also be used as a source of oxidizing ions, since the accelerator can react with different components within the high impact polymer, especially amine groups.

The accelerator can have an activation temperature of greater than 140 degrees Celsius. Exemplary accelerators can include tetramethyl thiuram disulphide (TMTD), tetramethyl thiuram monosulphide (TMTM), ethylidene aniline (DPG), mercaptobenz-thiazole (MBT), di-benzthiazyldisulphide (MBTS), and n-cyclohexylsulphenamide.

The concentration of the accelerator to the sulfur concentration or peroxide concentration can range from a ratio of 1:2 to a ratio of 1:10. An exemplary ratio of the accelerator to the sulfur or peroxide can be 1:8. Lower ratios can be used when the mixing device is a traditional single-screw extruder with three stages. Higher mass concentrations of the cross-linkable couple produce higher degrees of cross-linking, and can therefore use a higher screw torque.

It is contemplated that the accelerator can be an organic metallic accelerator that can decompose under the processing conditions for the high impact polymer. It is also contemplated that the accelerator concentration can range from 1% to 50% by weight of the nano-clay concentration.

The combination of one or more accelerators with metals, such as the metals retained in the nano-clay, can provide enhanced activation of ionic and redox reactions, in addition to the activation of the sulfur of the cross-linking agent. The combination of accelerators with metals is especially useful for promoting better activation within the interlayer spaces of the nano-clays.

An exemplary cross-linking agent can include 2 wt % of the peroxide, 2 wt % of the sulfur, 0.5 wt % of an accelerator, and 1 wt % to 40 wt % of a nano-clay. This mixture of a cross-linking agent, accelerator, and nano-clay can be mixed with a polymer, such as a polypropylene/polyethylene mixture in a 1:1 ratio. To cause the cross-linking, only a small amount of the cross-linking agent mixed with the nano-clay is needed. The small amount can be used to crosslink any polymer or combinations of polymers, including isotactic polypropylene, low density polyethylene, high density polyethylene, isotactic polybutene, styrene-acrylonitrile, acrylonitrile butadiene styrene, polyamide 6, polyvinyl chloride, and other similar polymers.

The embodied high impact polymer can include an elastomer combined with the polymer. The addition of an elastomer increases the impact strength of the cross-linked polymer. Examples of usable elastomers include ethylene propylene diene monomer (EPDM), ethylene propylene rubber (EPR), ethylene propylene monomer (EPM), and combinations thereof. The embodied polymers can include phtalic anhydride, which is usable for blending polypropylene with a cross-linked elastomer.

However, it is contemplated that the use of the nano-clay can provide the same benefits of an elastomer with increased effectiveness at decreased cost.

Further, the embodied polymers can include additional components, including odor controlling additives, such as potassium persulfate, antioxidants, fillers, such as talc, and combinations thereof. The embodied polymer can further include an ultraviolet stabilizer, such as maleic anhydride.

The present high impact polymer can be produced by the following method:

One or more nano-clays can be prepared using a peroxide, and mixed with a cross linking agent comprising a peroxide and a sulfur. The one or more nano-clays can also be mixed with one or more accelerators. Acetone can also be mixed with the nano-clays to prevent water absorption and to promote the diffusion of the accelerators and cross-linking agent.

The peroxide functionalizes the nano-clays by causing the nano-clay layers to become negatively charged and can also cause the one or more nano-clays to swell, creating space between layers for receiving one or more polymers, which can adhere to the layers via ionic attraction.

The functionalized nano-clays can then be dried. It is contemplated that the drying process can include placing the nano-clays in an oven for twenty-four hours, however other drying means can also be used.

The dried, functionalized nano-clays containing the cross-linking agent and one or more accelerators are then mixed in a single-step process with one or more polymers or other thermoplastic materials. The mixing can be performed using any type of mixing device, including plastographs, single-screw extruders, parallel twin type extruders, and vented extruders. In general, a conical twin-screw extruder will generate a cross-linked polymer with a higher degree of cross-linking than a parallel twin-screw with a high torque, while parallel twin-screw with a high torque will generate a cross-linked polymer with a higher degree of cross-linking than that obtained by a single-screw extruder. It is contemplated that a single-screw extruder can provide a torque of at least sixty turns per minute.

In an embodiment, the one or more polymers can be prepared as a simple solid state mixture of polymer granules in a peroxide powder, thereby providing an appropriate dispersion of polymer granules in the powder.

The torque, mixing time, and temperature can be varied to adjust the rate and amount of cross-linking. It is contemplated that only a low torque is necessary to effectively cause cross-linkage. The mixing process can cause nano-clay layers having a thickness of 30 angstroms or less to be dispersed throughout the polymer, providing enhanced strength and insulating properties throughout the resulting high impact polymer.

The embodied cross-linking processes that form the embodied high impact polymers are fully chemical. The reaction is homolytic. The cross-linking agent reacts at temperatures corresponding to polymer transformation and mixing temperatures. The macro molecular chains of the polymer are cross-linked by bridges formed from sulfur.

Due to the effective dispersion of the cross-linking agent within the nano-clay, no additional fillers, such as vegetable oil, are necessary to mix with the cross-linking agent, thereby saving costs and time associated with preparation of the cross-linking agent. In an embodiment, the cross-linking agent and the nano-clay can be blended with 1% to 40% acetone by weight.

The cross-linking agent and/or the nano-clay can be resident in a compression/mixing section of the extruder for less than thirty seconds to produce an essentially colorless cross-linked polymer. The cross-linking agent can be resident in a compression/mixing section of the extruder for less than one second and still produce quality cross-linked polymers. A vacuum pump can be added to the extruder to facilitate the extrusion process.

Cross-linking with the peroxide is initiated using the accelerator to partially inhibit the cross-linking of the peroxide. This step is performed at a temperature of about 140 degrees Celsius, but other initiation temperatures can be used. The cross-linking reaction is initiated by the peroxide radical, which forms macro radicals. A propagation reaction with sulfur occurs to create covalent bonds. The propagation reaction takes place before the quick stop of these macro radicals. The lifespan of the macro radicals can depend on the type of peroxide used, and it is contemplated that the macro radicals can have a lifespan longer than that of the peroxide due to the continuous shearing, controlled by low viscosity at equilibrium. The peroxide can be a mixture of selected peroxides that can lengthen the life of the macro radicals. In addition, combinations of several types of accelerators can significantly improve the speed of activation of sulfur. The simultaneous reactions ensure that the cross-linking is optimal for each formulation.

In addition to initiating the cross-linking reaction both within interlayer spaces in the nano-clay and exterior to the nano-clay layers, the peroxide also facilitates the grafting of the macromolecules with layers of silicon dioxide within the nano-clay due to the combination of oxygen radicals and sulfur within the mixer.

It is contemplated that the cross-linking reaction can be continuous over time at a low temperature, or the reaction can be finished at a faster rate using thermal treatment.

The peroxide radical ensures the macro radical formation, while the sulfur causes the macromolecular chains to join through the formation of a heat stable three-dimensional network. The addition of a single accelerator or a mixture of accelerators and sulfur is sometimes required in order to ensure that the formation of macro radicals and the coupling occur simultaneously. This method results in forming macromolecular chains of polymer with sulfur bridges without the need for high torque in the extruder. The accelerator ensures that the cross-linking and the formation of sulfur bridges occur simultaneously.

The accelerator also reacts with the octahedral structure of the nano-clay, destroying this strong crystalline structure by active organo-metallic reactions at high temperature. This causes the tetrahedral crystalline structure of the nano-clay to weaken to create sufficient interlayer distance to permit the nano-clay layers to exfoliate in a random manner. This is a significant advantage over conventional chemical treatments, which use sodium ions to destroy the octahedral structure of a nano-clay in a separate reaction. The present recyclable high impact polymer is instead produced in a single step.

The nano-clay can be separated into tetrahedral layers, having a perpendicular octahedral crystalline structure. The tetrahedral layers are charged to allow the polymers to adhere to the layers, after which the octahedral structure is destroyed, allowing the tetrahedral layers to exfoliate, forming interlayer spaces. The adherence of the polymers to the nano-clay facilitates the reversibility of the cross-linkages that are formed by promoting the formation of reversible polymer chains and shapes, while preventing the formation of chain-stopping polymer forms and non-reversible cross linkages.

The optimization of the degree of cross-linking depends on the efficiency of the peroxide radical and sulfur speed of activation. The efficiency of the peroxide radical and sulfur speed of activation is considered in relation to the transformation temperature and the specific characteristics and performances of the extruder. The degree of cross-linking depends upon the concentration of the cross-linkable couple that, in turn, is based upon the mass ratio of the components. For example, the percentage of cross-linking can depend upon the concentration of peroxide to sulfur and the concentration of the accelerator to sulfur. Peroxide, sulfur, and accelerators can be used in equal parts, or peroxide can be used in greater or lower ratios.

Several compositions of the cross-linking agents have been successfully achieved up to a mass ratio of twice the sulfur mass. The compositions that resulted in a mass ratio of twice the sulfur mass include the DI (2-terl-butylperoxydopropyl) benzene as the peroxide in ethylene vinyl acetate; tetramethyl thiuram disulphide (TMTD) and tetramethyl thiuram monosulphide (TMTM) as the accelerators. DI (2-terl-butylperoxydopropyl) benzene is a mixture of isomer 1.3 and 1.4 di (2-tertbutylperoxyisopropyl) benzene.

The analysis of dynamic rheology using a plastograph can facilitate the monitoring and control of the degree of cross-linking and the formation of interpenetrating networks for incompatible mixes, such as polypropylene and various types of polyethylene.

EXAMPLE 1

A 1:1 mixture of polypropylene and polyethylene were subjected to the embodied methods in a plastograph room of 30 ml, at a temperature of 180 degrees Celsius, with an extruder torque of 60 turns/min. The couple concentrations were as follows: peroxide 2%, sulfur 2% and TMTD 0.5% in the polymer mass used. The overall polymer mass was 28 grams. The maximum cross-linking time was three minutes at a torque over 1,600 Kgf.m. 4% to 5% nano-clay, by weight, was mixed with the polymer.

While these embodiments have been described with emphasis on the preferred embodiments, it should be understood that within the scope of the appended claims, the embodiments might be practiced other than as specifically described herein.

What is claimed is:

1. A method for making a recyclable high impact polymer composite comprising the steps of:
   a. mixing at least one nano-clay with at least one peroxide forming a functionalized nano-clay;
   b. drying the functionalized nano-clay;
   c. mixing the functionalized nano-clay with a cross-linking agent and at least one accelerator, wherein the cross linking agent comprises a sulfur and a peroxide, thereby forming a nano-clay mixture; and
   d. mixing the nano-clay mixture with at least one polymer forming the partially crystalline reversibly cross-linked high impact polymer composite, with macromolecular chains of polymer with sulfur bridges.

2. The method of claim 1, further comprising mixing the functionalized nano-clay with an acetone.

3. The method of claim 2, wherein the mixing is performed using a plastograph, an extruder, a mixer, or combinations thereof.

4. The method of claim 2, further comprising heating the nano-clay mixture during mixing to a temperature of at least 140 degrees Centigrade.

5. The method of claim 2, wherein the mixing is performed under pressure.

* * * * *